United States Patent [19]

Yoshida

[11] Patent Number: 5,289,468
[45] Date of Patent: Feb. 22, 1994

[54] PERMANENT ADAPTER HAVING MODULATION AND DEMODULATION MEANS FOR CONNECTING NETWORKS

[75] Inventor: Atsushi Yoshida, Tokyo, Japan

[73] Assignee: NEC Corporation, Tokyo, Japan

[21] Appl. No.: 925,120

[22] Filed: Aug. 6, 1992

[30] Foreign Application Priority Data

Aug. 9, 1991 [JP] Japan .................................. 3-200676

[51] Int. Cl.⁵ ............................................. H04L 12/66
[52] U.S. Cl. ................................. 370/85.13; 370/85.1
[58] Field of Search .................. 370/85.13, 85.14, 85.1

[56] References Cited

U.S. PATENT DOCUMENTS

| | | | |
|---|---|---|---|
| 4,706,081 | 11/1987 | Hart et al. ........................ | 340/825.03 |
| 4,847,837 | 7/1989 | Morales et al. .................... | 370/16 X |
| 5,095,480 | 3/1992 | Fenner ............................. | 370/94.1 |
| 5,153,876 | 10/1992 | Sin ................................ | 370/85.14 X |

Primary Examiner—Douglas W. Olms
Assistant Examiner—Russell W. Blum
Attorney, Agent, or Firm—Foley & Lardner

[57] ABSTRACT

A terminal adapter including modulation and demodulation circuits for connecting a LAN and a WAN on the basis of an Internet standard protocol prescribing a procedure of communication as well as terminating a line service and providing data transmission to a terminal system. The terminal adapter further includes an extractor for extracting, from packets constituted by received data as an output of the demodulation circuit and transmitted data as an input to the modulation circuit, a simple network management Protocol message indicating the Internet standard network control protocol, and network control means for performing network control according to the simple network management protocol message and performing network control according to signals obtained from the modulation and demodulation circuits.

1 Claim, 2 Drawing Sheets

PERMANENT ADAPTER HAVING MODULATION AND DEMODULATION MEANS FOR CONNECTING NETWORKS

BACKGROUND OF THE INVENTION

The present invention relates to a terminal adapter and, more particularly, to a terminal adapter which can effect efficient network monitoring when a plurality of LANs (Local Area Networks) are connected to one another via a WAN (Wide Area Network).

A LAN permits efficient inter-computer communication, and to date it has been utilized in a very wide variety of fields. Meanwhile, there may arise a case in which, after establishment of a LAN, its constituent computers are increased up to a physical limit, or a case in which it is intended to make communication with a computer in a different LAN established in a separate area. In such cases, it is necessary to expand the network or connect networks using a WAN. For connecting a LAN and a WAN or connecting LANs via a WAN (which is hereinafter referred to as LAN-WAN connection), a terminal adapter is utilized.

Heretofore, this type of LAN-WAN connection is realized by using gateway unit repeaters, bridges, routers and so forth. The gateway unit is a system for connecting networks of different systems. Usually, it has a protocol including a physical layer and a transport layer or more than these layers. The protocol is based on Ethernet and TCP/IP (Transmission Control Protocol/Internet Protocol) and constituted by a number of layers such as a physical layer, a data link layer, a network layer, a transport layer and an application layer.

When the gateway unit accesses an exclusive line or a switching line, including ISDN, via a terminal adapter, it effects in advance termination of the communication protocol in the LAN and protocol transform to a serial transmission form used in the WAN. Usually, the physical layer and data link layer in the LAN communication protocol are constituted by Ethernet or token ring and the network layer is constituted by IP. As the protocol for conversion to the serial transmission form for accessing the WAN, commonly called SLIP (Serial Line IP) is used.

For the LAN-WAN connection noted above, a protocol called SNMP (Simple Network Management Protocol) is usually used for network control of the LAN and gateway unit. The SNMP prescribes a general network control system. However, the control message is exchanged on the UDP (User Datagram Protocol) which is a layer above the IP noted above. Meanwhile, the terminal adapters are used as modems, ISDN-TAs, multiplexing systems and so forth. These facilities perform network control according to such information as line signal level and signal-to-noise ratio, and they individually use peculiar network control systems not based on SNMP.

Therefore, for a LAN-WAN connection, it is necessary to operate independently a network control system for the LAN and gateway unit and a network monitoring system for the terminal adapter. This means that the network user has to use two independent control systems. Alternately, a third system is necessary, which effects collective network control by collecting information obtained from the above two control systems. Therefore, it is impossible to obtain effective management and control.

SUMMARY OF THE INVENTION

It is therefore an object of the invention is to provide a terminal adapter, which permits efficient network control.

According to the present invention there is provided a terminal adapter having modulation means and demodulation means and for connecting a LAN and a WAN on the basis of an Internet standard protocol prescribing a procedure of communication as well as terminating a line service and providing data transmission to a terminal system, the terminal adapter comprising:

extraction means for extracting, from packets constituted by received data as an output of the demodulation means and transmitted data as an input to the modulation means, a simple network management Protocol message indicating the Internet standard network control protocol; and network control means for performing network control according to the simple network management protocol message and performing network control according to signals obtained from the modulation and demodulation means.

Other objects and features will be clarified from the following description with reference to the accompanied drawings.

PREFERRED EMBODIMENTS

Now, the invention will be described with reference to the drawings.

Figure 1:
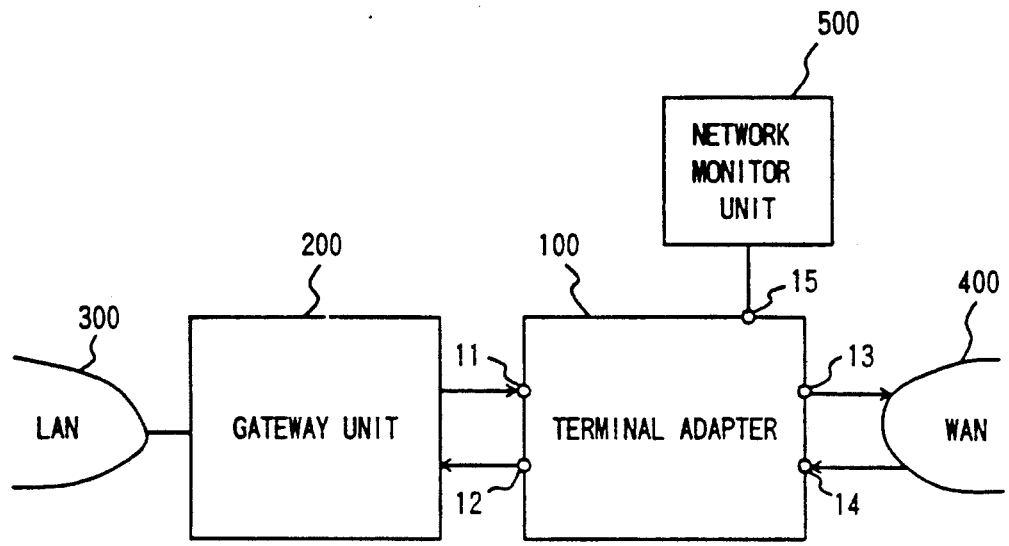
FIG. 1 is a block diagram showing a network control system having a LAN-WAN connection structure using a terminal adapter according to the present invention.

FIG. 1 is a block diagram showing a network control system using an embodiment of the terminal adapter according to the invention.

Referring to FIG. 1, a LAN 300 is connected to a gateway unit 200, which is, in turn, connected to the terminal adapter 100 via terminals 11 and 12 thereof. The terminal adapter 100 has the other pair of terminals 13 and 14 connected to a WAN 400. Thus, it is capable of communication with computers (not shown) constituting LANs connected to the WAN 400.

Figure 2:
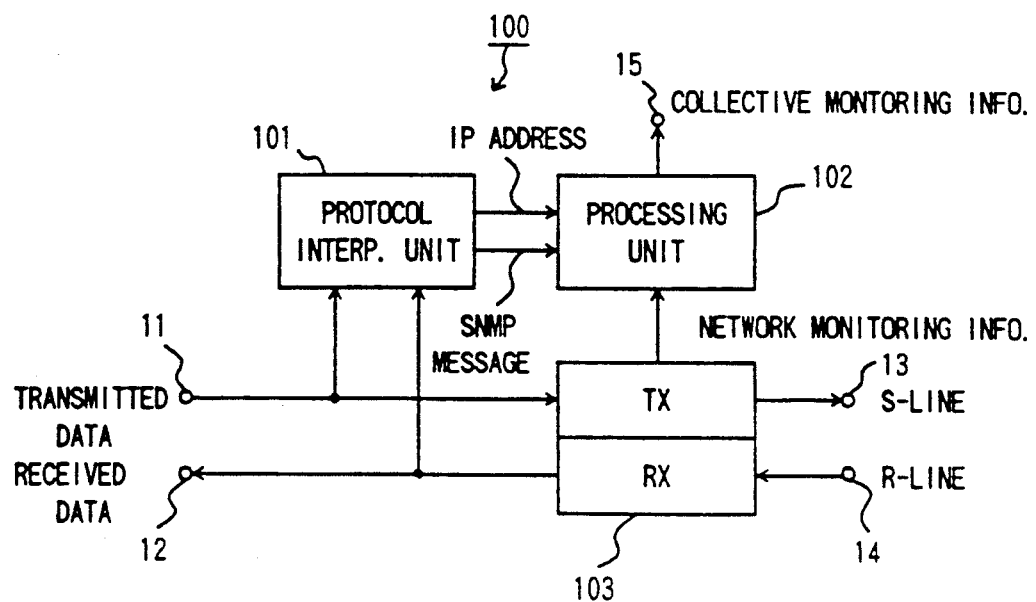
FIG. 2 is a block diagram showing an example of the terminal adapter according to the present invention.

In this embodiment, such information as normal line signal level and signal-to-noise ratio, obtained in the terminal adapter 100, is supplied via a terminal 15 to a network monitor unit 500. Further, as will be described later, the terminal adapter 100 uses SNMP (Simple Network Management Protocol) as network control information of the LAN 300 and gateway unit 200. The gateway unit 200, which is connected to the LAN 300 and also to the terminals 11 and 12, is provided with network control function in SLIP, with SNMP as a serial line protocol. The terminal adapter 100, as shown in FIG. 2, comprises a protocol interpretation unit 101, a processing unit 102 and a modulation/demodulation (MODEM) unit 103. The terminal connected to the terminals 11 and 12 can access the WAN 400 via the modulation/demodulation unit 103, which has a transmitting section TX and a receiving section RX, and the terminals 13 and 14. There is no limitation or specification on the kind of the WAN or on the modulation/demodulation system of the modulation/demodulation unit. In this embodiment, however, the WAN 400 is constituted by an analog exclusive line, and the modulation/demodulation unit 103 is constituted by a 9.6 bps modem of the voice band.

The modulation/demodulation unit 103 supplies such information as line signal level or signal-to-noise ratio to the processing unit 102. The protocol interpreting unit 103 monitors the transmitted data, transmitted via the gateway unit 200, and received data from the modulation/demodulation unit 103, and it extracts IP addresses of the source and destination SNMP messages from each data packet and supplies these extracted data to the processing unit 102.

The processing unit 102 combines network monitoring information supplied from the modulation/demodulaton unit 103 and the IP addresses (of the source and destination) and SNMP message from the protocol interpretation unit 101 and supplies the combined information as collective monitoring information via the terminal 15 to the network monitoring unit 500.

Figure 3:
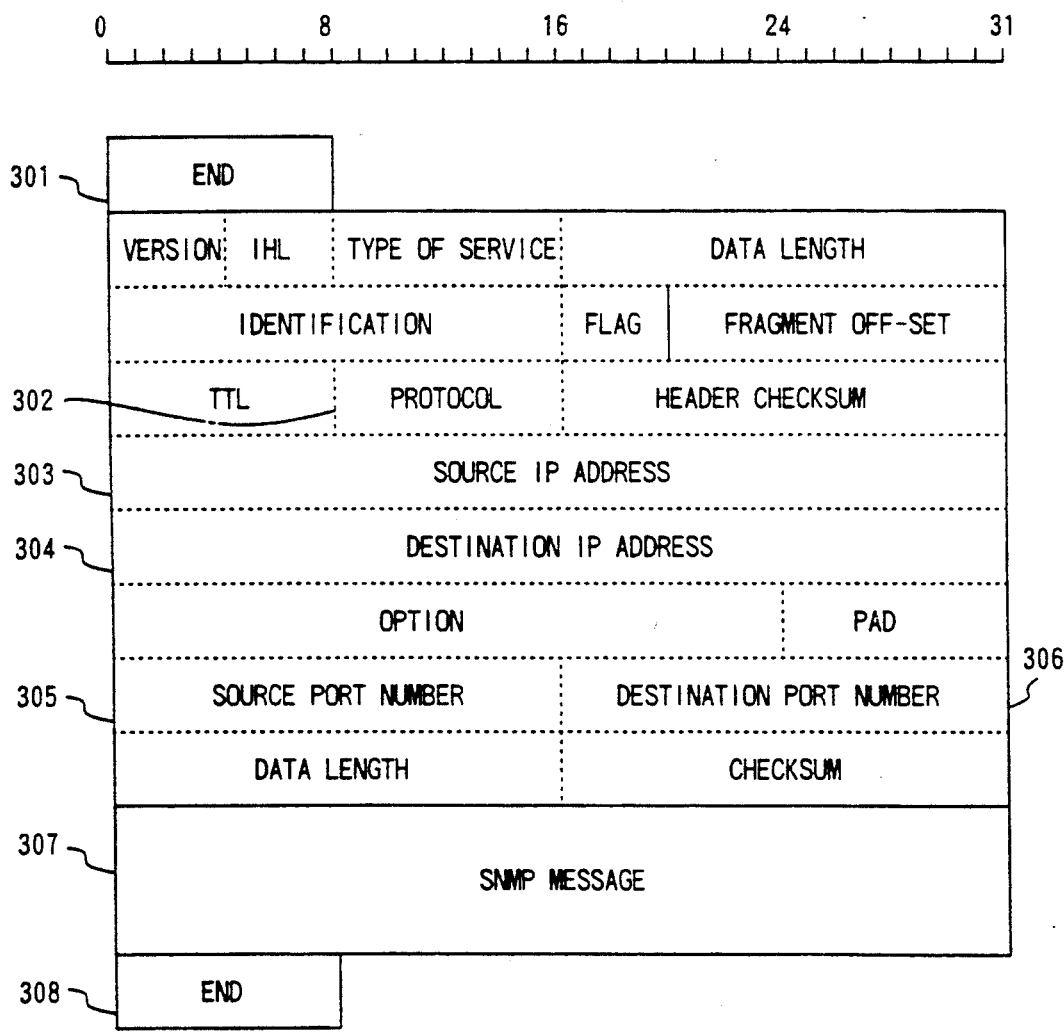
FIG. 3 is a view showing an example of the packet configuration in an embodiment of the present invention.

The packet frame is constituted as shown in FIG. 3. The packet has END characters 301 and 308 in its first and last parts. It also has VERSION indicating the PI protocol version, THL indicating the length of the datagram header, TYPE OF SERVICE indicating the manner of handling of the datagram, DATA LENGTH, IDENTIFICATION (ID) which is an integral number identifying the datagram, FLAG constituted by a bit indicating whether or not the packet disassembling is possible and a bit indicating whether a packet is the last packet when packet disassembling has been done, FRAGMENT OFF-SET indicating the corresponding position of original data to disassembled packet, TTL (Time To Live) indicating the time in seconds, during which a packet may be present in the network, PROTOCOL 302 as an ID protocol field for identifying an upper layer protocol, HEADER CHECKSUM, SOURCE TP ADDRESS 303, DESTINATION IP ADDRESS 304, OPTION, PAD, SOURCE PORT NUMBER 305, DESTINATION PORT NUMBER 306, DATA LENGTH, CHECKSUM, and SNMP MESSAGE 307.

In the protocol interpretation unit 101, the IP addresses and SNMP message are extracted as follows. First, the End characters 301 and 308 provided at the first and last parts of the packet are confirmed. Then, the PROTOCOL 302 is checked. If it is not a UDP (User Datagram Protocol), SNMP is not contained. Thus, the routine is ended. If the PROTOCOL 302 is a UDP, it is possible that SNMP is contained. Thus, the SOURCE PORT NUMBER 305 and DESTINATION PORT NUMBER 306 are checked to determine whether datagram of protocol is contained. If no SNMP message is contained, the routine is ended. On the other hand, if SNMP message is contained, the SOURCE IP ADDRESS 303 and DESTINATION IP ADDRESS 304 are extracted and output to the processing unit 102 to confirm the host address, at which the message data is exchanged. Then, the SNMP MESSAGE 307 is extracted and supplied to the processing unit 102.

As has been shown in the foregoing, with the terminal adapter according to the invention it is possible in a LAN-WAN connection system to collectively control a network control system belonging to a LAN and a gateway unit and a network monitoring system belonging to the terminal adapter with a simple constitution.

What is claimed is:

1. A terminal adapter, having modulation means and demodulation means, for connecting a LAN and a WAN on the basis of an Internet standard protocol describing a procedure of communication as well as terminating a line service and providing data transmission to a terminal system, said terminal adapter comprising:

extraction means for extracting, from packets constituted by received data as an output of said demodulation means and transmitted data as an input to said modulation means, a simple network management protocol message indicating said Internet standard network control protocol, said extraction means including means for extracting from said packets of transmitted and received data, source and destination protocol addresses indicate of logical addresses for recognizing a host in said Internet;

wherein said extraction means further includes means for checking a protocol field in each of said packets to determine if said checked protocol field meets a predetermined condition and, if said checked protocol field meets a first predetermined condition, checking source and destination port numbers, and extracting, if said checked source and destination port numbers meet a second predetermined condition, source and destination Internet protocol addresses; and network control means for performing network control according to said simple network management protocol message and performing network control according to signals obtained from said modulation and demodulation means.

* * * * *